United States Patent [19]

Nakane et al.

[11] Patent Number: 4,837,601

[45] Date of Patent: Jun. 6, 1989

[54] AUTOMATIC PHOTOGRAPHIC PAPER PROCESSING APPARATUS

[75] Inventors: Nobu Nakane; Noriharu Maruyama, both of Tokyo; Haruo Hakamada, Kanagawa, all of Japan

[73] Assignee: Konishiroku Photo Industry Co., Ltd., Tokyo, Japan

[21] Appl. No.: 245,007

[22] Filed: Sep. 15, 1988

Related U.S. Application Data

[63] Continuation of Ser. No. 924,842, Sep. 19, 1986, abandoned.

[30] Foreign Application Priority Data

Jan. 30, 1985 [JP] Japan ................................ 60-14455
Mar. 6, 1985 [JP] Japan ................................ 60-42816

[51] Int. Cl.[4] .................... G03B 27/32; G03B 27/52
[52] U.S. Cl. ............................................ 355/28; 355/29
[58] Field of Search .............................. 355/27, 28, 29

[56] References Cited

U.S. PATENT DOCUMENTS

| 3,516,741 | 6/1970 | Thaddey | 355/29 |
| 3,557,675 | 1/1971 | Koll et al. | 355/28 |
| 3,811,768 | 5/1974 | Zahn et al. | 355/29 |
| 4,115,817 | 9/1978 | Suzuki et al. | 355/28 |
| 4,429,988 | 2/1984 | Okabe | 355/28 |
| 4,444,485 | 4/1984 | Kogane | 355/29 |
| 4,447,146 | 5/1984 | Kogane et al. | 355/28 |

FOREIGN PATENT DOCUMENTS

| 40426 | 3/1980 | Japan . |
| 115035 | 9/1980 | Japan . |
| 48039 | 3/1983 | Japan . |
| 42528 | 3/1984 | Japan . |

Primary Examiner—Monroe H. Hayes
Attorney, Agent, or Firm—Jordan B. Bierman

[57] ABSTRACT

An automatic photographic paper processing apparatus wherein between an exposure unit (2) for printing a photographic paper and a transferring means (9) for discharging an exposed photographic paper a discharge accumulating unit (A2) for accumulating temporarily the exposed photographic paper is provided, so that when an amount of the photographic paper accumulated at the discharge accumulating unit (A2) is decreased the photographic paper is cut by operating a cutter unit (20) arranged at the downstream of the exposure unit (2) and then the transferring speed at the transferring means (9) is increased.

An automatic photographic paper processing apparatus wherein a paper accumulating unit (102) for accumulating temporarily sensitive photographic materials fed from an exposure unit (2) is provided at a position preceding a developing processing unit (103) consisting of a plurality of processing tanks (131, 132, 133, 134).

10 Claims, 4 Drawing Sheets

AUTOMATIC PHOTOGRAPHIC PAPER PROCESSING APPARATUS

This application is a continuation of application Ser. No. 924,842, filed Sept. 19, 1986, now abandoned,

TECHNICAL FIELD

The present invention relates to an automatic photographic paper processing apparatus for exposing, printing and developing images on sensitive photographic materials.

BACKGROUND ART

As is generally known, on an automatic photographic printer, sensitive photographic materials, such as monochromatic photographic papers or color photographic papers coated with a photosensitive layer containing image forming color substances such as a yellow dye, a magenta dye and a cyan dye (hereinafter referred to as "photographic papers"), are fed successively to the exposure unit for exposure in which optical images corresponding to images formed on an exposed and developed negative film are projected on the photographic papers, and then the exposed photographic papers are delivered successively to an automatic developing apparatus comprising a plurality of processing tanks for developing, fixing, stabilizing and washing, where the exposed photographic papers are subjected to developing, fixing, stabilizing and washing processes to complete the photographic printing process.

Recently, from the viewpoint of the quick delivery of photographs, there has appeared a tendency to regard completing a series of photographic processes including the development of negative films, printing images on photographic papers, developing the photographic papers and finishing the photographs at retail shops, such as camera shops, as advantageous. Accordingly, the development of an automatic printing and developing system having a comparatively compact and simple construction has been desired.

However, the conventional automatic photographic printer of such a kind has problems that a series of processes such as mounting photographic papers, exposure and conveyance of photographic papers are not automated perfectly and the integration of the developing unit and the printing unit is difficult, and has many drawbacks to be improved.

In such integrated automatic printing unit and developing unit, however, it is difficult to operate with a large efficiency said both units while forwarding continuously the sensitive photographic materials, because said both units are quite different in the maximum processing speed.

DISCLOSURE OF INVENTION

The present invention was invented under the above background. An object of the present invention is to provide an automatic photographic paper processing apparatus which returns quickly to an initial state from forcedly cut state at the photographic paper feeding which is carried out when the exposure processing of the photographic paper is interrupted etc., and attains the printing processing with good efficiency.

The object can be attained by an automatic photographic paper processing apparatus comprising:

(a) an exposure unit for printing an optical image on a photographic paper by projecting the optical image to be printed;

(b) a paper transferring means for discharging an exposed photographic paper which is fed from the exposure unit;

(c) a discharge accumulating unit for accumulating temporarily the exposed photographic paper between the paper transferring means and the exposure unit;

(d) a cutter unit arranged in the downstream of the exposure unit; and (e) a control means for cutting the photographic paper by operating the cutter unit and then increasing the feeding speed at the paper transferring means, when an iamount of accumulated photographic paper accumulated at the discharge accumulating unit is decreased.

In the apparatus thus constituted, when the fact that the accumulated amount of the photographic paper at the discharge accumulating unit is smaller than a predetermined amount is detected by a detecting sensor, the photographic paper is cut (forcedly) at a predetermined position thereof in the cutter unit, the forwarding speed of the forwarding means is increased for rapid feeding of the photographic paper in the accumulating unit, and the photographic paper is discharged by a control means which is operated by a signal from said sensor.

Another object of the present invention is to provide an automatic developing apparatus which solves a problem in the systematization with an automatic printing apparatus, enables smoothly the developing processing of the exposed sensitive photographic materials transferred continuously from the automatic printing apparatus, and attains the printing and developing of the sensitive photographic materials continuously by series steps with a good efficiency.

The above problem can be attained by an automatic developing apparatus for carrying out a developing processing of exposed sensitive photographic materials by passing the same successively through a developing processing unit consisting of a plurality of processing tanks arranged by side-by-side relationship, wherein a paper accumulating unit for accumulating temporarily sensitive photographic materials transferred from a printing apparatus is provided at a stage preceding said developing processing unit.

In the apparatus constructed as above, the paper accumulating unit for accumulating the sensitive photographic materials is provided at the stage preceding many processing tanks for developing, fixing, stabilizing, washing etc., that is, between these processing tanks and an inlet of the exposed sensitive photographic materials. Accordingly, the sensitive photographic materials transferred from the automatic printing apparatus can be developing processed smothly and continuously by accumulating temporarily the sensitive photographic materials supplied at a speed higher than the processing speed at the automatic developing apparatus.

BEST MODE FOR CARRYING OUT THE INVENTION

An emobdiment of the present invention will now be explained detailedly with reference to the drawings.

Figure 1:
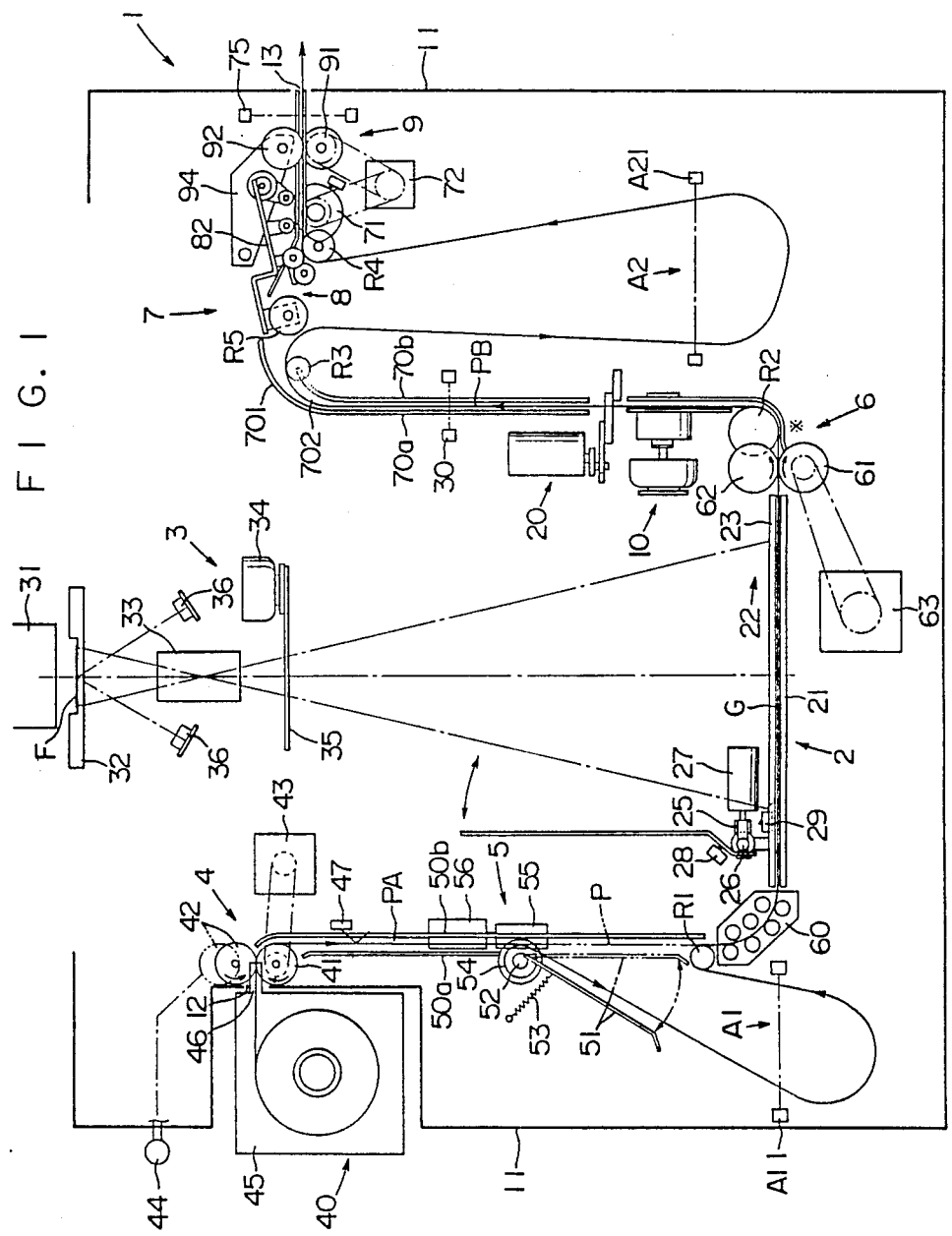
FIG. 1 is an explanatory illustration showing the general internal construction of a preferred embodiment of the present invention.
Figure 2:
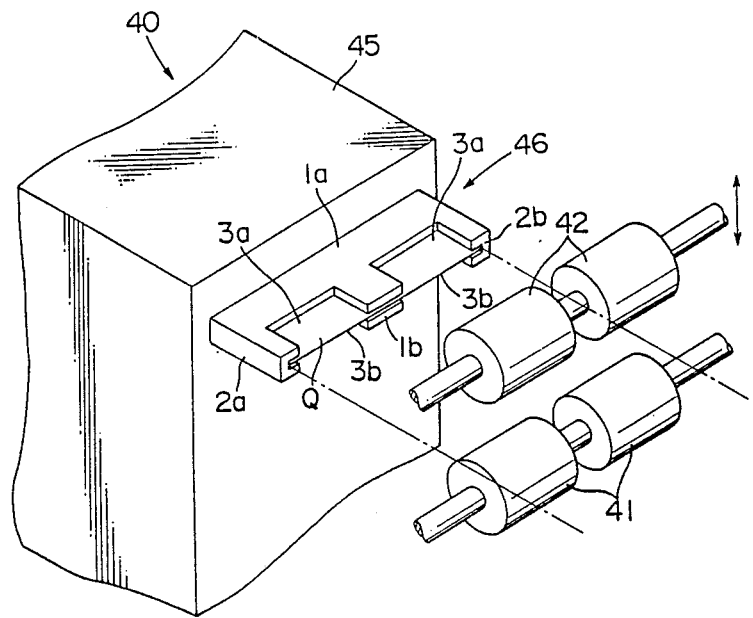
FIG. 2 is an enlarge perspective view of a magazine and a paper feeding unit according to the present invention.

Referring to FIG. 1, the interior of the body 1 of an automatic photographic printer is shielded form light by a case 11 (partly omitted). An exposure unit 2 and an exposure mechanism 3 for projecting an optical image corresponding to a negative formed on a negative film on the exposure unit are disposed in the lower part of the central section and in the upper part of the central section, respectively, of the body 1. An entrance 12 for feeding a photographic paper (hereinafter referred to simply as "a paper") therethrough, and an exit 13 for delivering the exposed paper therethrough are formed in the respective upper portions of the opposite side panels of the case 11, respectively. On the whole, a paper passage extends within the body 1 from the entrance 12 downward through a feed accumulating unit A1 to the exposure unit 2, upward from the exposure unit 2 through a discharge accumulating unit A2 to the exit 13. A paper feeding unit 4 for feeding a paper drawn out from a magazine 40 mounted on the body 1 and a movable guide unit 5 for forming a paper loop in the feed accumulating unit A1 are disposed along the paper passage section PA extending from the entrance 12 to the exposure unit 2. A paper transferring unit 6, a perforating unit 10, a cutting unit 20, a hole detector and a paper delivering unit 7 for forming a paper loop in the discharge accumulating unit A2 and for conveying the paper are disposed sequentialy along the paper passage section PB extending between the exposure unit 2 and the exit 13.

The exposure unit 2 comprises a base 21 fixed to the body 1, and a mask 23 disposed opposite to the base 21 with the paper passage therebetween to define an exposure area 22. Indicated at 24 is a plate-shaped or frame-shaped paper guide pivotally supported at the lower end thereof so as to swing about the lower end thereof between a vertical position and a horizontal position. The paper guide 24 is controlled for swing motion through a worm 25 and a worm wheel 26 by a control motor 27. In automatic paper loading operation, the paper guide 24 is turned to the horizontal position over the exposure area 22 to form a gap G between the paper guide 24 and the base 21 to pass the paper therethrough. During exposure operation, the paper guide 24 is returned to the vertical position or, in case the paper guide 24 is used also as a mask, the paper guide is held in the horizontal position. Indicated at 28 and 29 are limit switches which detect the arrival of the paper guide 24 at an upper limit position and at a lower limit position, respectively, for controlling the control motor 27.

In this embodiment, the exposure mechanism 3 comprises, in a sequential downward arrangement, a light source 31 having built-in color compensating filters (yellow, magenta and cyan), a negative carrier 32 for holding a negative film F, a lens 33, and a dark shutter 35 controlled for operation by an electromagnetic actuator 34, and photometric elements 36 disposed around the lens 33 to detect the light transmitted through the negative film for the selection of the color compensating filters and the control of the dark shutter 35.

The paper feeding unit 4 comprises a feed roller 41 disposed adjacent to the entrance 12, and a pressure roller 42. The feed roller 41 is driven for clockwise rotation by a motor 43 having a built-in one-way clutch. The pressure roller 42 is capable of being moved by a lever 44 through a linkage, not shown, between a resting position where the pressure roller 42 is separated upward from the feed roller 41 and an operating position where the pressure roller 42 is pressed against the feed roller 41.

The magazine 40 comprises a box 45 for containing a roll of paper to be exposed, and a paper guide 46 projecting from the upper part of one side wall of the box 45. The paper guide 46 is inserted through the entrance 12 into the interior of the body 1. As illustrated in detail, the paper guide 46 comprises an upper guide plate 1a, a lower guide plate 1b and side plates 2a and 2b. Recesses 3a and 3b for receiving the lower portion of the pressure roller 42 and the upper portion of the feed roller 41 are formed in the upper guide plate 1a and the lower guide plate 1b, respectively.

In FIG. 1, indicated at 50a and 50b are a pair of guide plates for vertically guiding the paper, and at 47 is a paper detecting switch.

The movable guide unit 5 has a guide plate 51 (indicated by double-dots-dashes lines in FIG. 1) disposed in alignment with the extension line of the guide plate 50a, is joined pivotally to a shaft 52 at the upper end thereof, and is connected to one end of an extension spring 53 which causes the guide plate 51 to swing so that the lower end thereof will move away in a direction to form the feed accumulating unit A1 from a paper passage P indicated by double-dots-and-dashes lines in FIG. 1. The shaft 52 is driven for rotation by an electromagnetic actuator 56 connected to a rack 55 meshing with a pinion 54 fixed to the shaft 52.

A11 is a loop detector for detecting a paper loop formed in the feed accumulating unit A1, R1 is a guide roller,, and 60 is a turn guide comprising a plurality of rollers. The paper is bent horizontally in an opposite direction (rightward in the Figure) to the feed accumulating unit A1.

The paper transferring unit 6 is disposed after and adjacent to the exposure unit 2. The paper transferring unit 6 comprises a main transfer roller 61 and a pressure roller 62, which are disposed on opposite sides of the paper passage PB, respectively. The main transfer roller 61 is driven for rotation in the normal or reverse direction by a pulse motor 63. Indicated ar R2 is a turn roller for turning the paper upward in a vertical direction.

A pair of paper guides 70a and 70b guides the paper delivered from the exposure unit 2 vertically upward. The respective upper ends of the paper guides 70a and 70b are curved in arcs, respectively, rightward toward the exit 13 to form curved guiding sections 701 and 702. A guide rolller R3 is disposed adjacent to the extremity of the curved guiding section 702 of the paper guide 70b. The radius of curvature of said curved guiding section 701 is made smaller than that of the tip end of the paper guided or a curved portion formed by the paper curl, so that the paper can be transferred along the curved guiding section 701 stably.

Figure 3:
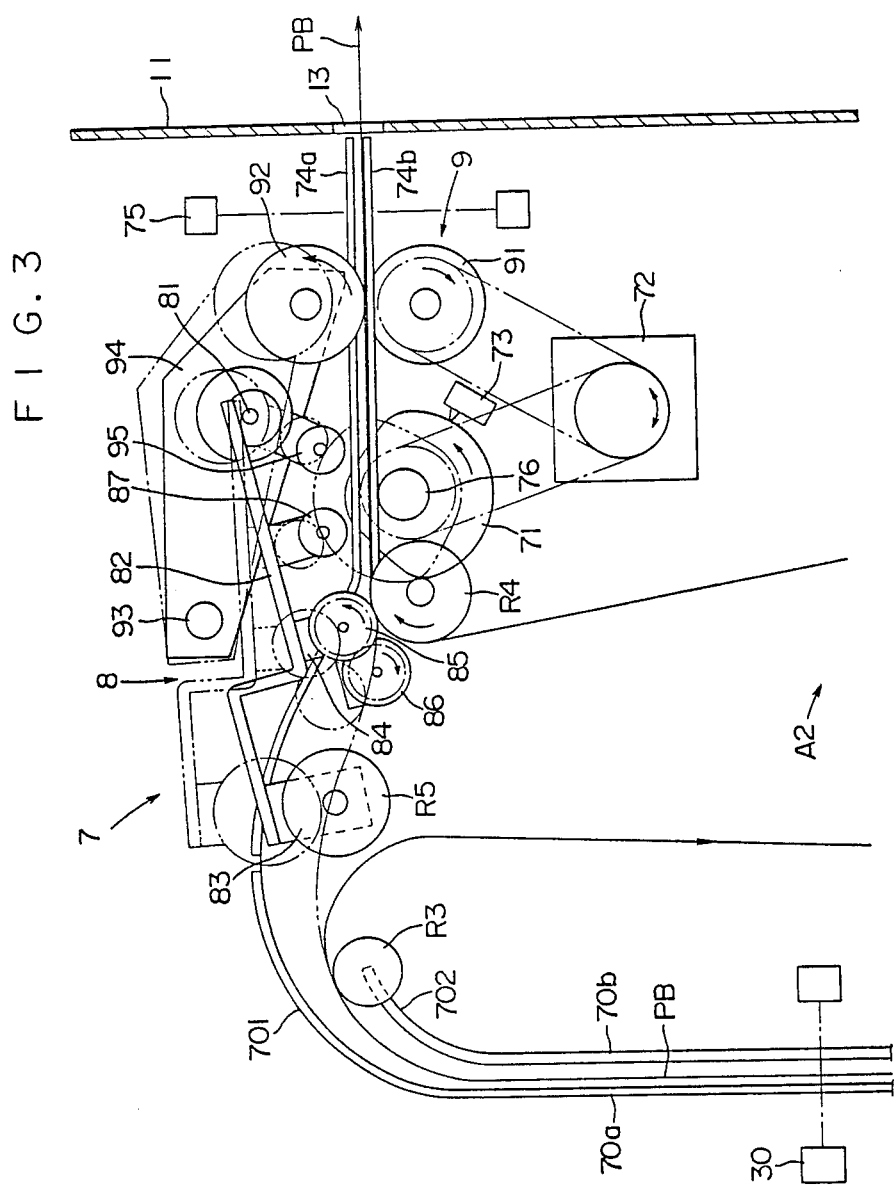
FIG. 3 is an enlarge side elevation of a paper delivering unit according to the present invention.

As shown in an enlarged view in FIG. 3, the paper delivering unit 7 comprises two mechanisms, namely, a loop guiding mechanism 8 for forming a paper loop in the discharge accumulating unit A2 and for facilitating the smooth movement of a paper loop formed in the discharge accumulating unit A2, and a conveying mechanism 9 for delivering the paper through the exit 13 outside the body 1.

The loop guiding mechanism 8 comprises a guide roller R4 disposed at the exit of the discharge accumulating unit A2 to guide the paper into the conveying mechanism 9, and a loop forming roller R5 disposed substantialy intermediately between the guide roller R4 and the guide rolller R3 disposed at the entrance of the discharge accumulating unit A2. The loop forming roller is supported rotatably on the free end of a supporting arm 82 by means of a holder 83. The supporting arm 82 is supported swingably on a shaft 81. A regulating roller 85 is supported on the supporting arm 82 by means of a holder 84 so as to be in contact with the guide roller R4. The regulating roller 85 and the guide roller R4 constitute a guide roller unit. The regulating roller 85 is interlocked with a folding preventing roller 86 by meshing gears. Indicated at 87 is a cam roller supported on the supporting arm 82 near the base end of the same so as to be driven by a cam 71.

The conveying mechanism 9 of the paper delivering unit 7 comprises a delivery roller 91 and a pressure roller 92 which are disposed opposite to each other with the paper passage PB therebetween at a position near the exit 13 inside the case 1. A one-way clutch is incorporated into the delivery roller 91 so that the delivery roller 91 is rotatable only in a clockwise direction. The delivery roller 91 is driven by a motor 72. The pressure roller 92 is supported rotatably on the extremity of a swing arm 94 pivotally supported at the base end thereof on a shaft 93. A cam roller 95 is provided at the lower end of the swing arm 94 so as to be driven by the cam 71.

The cam 71 is a shell-shaped eccentric cam having a portion having an increased radius and is driven by the motor 72. A one-way clutch is incorporated into the cam 71 so that the cam 71 is rotatable only in a counterclockwise direction on cam shaft 76. A switch 73 is provided to detect the phase of the cam 71.

Indicated at 74a and 74b are paper guides and at 75 is a paper detector disposed near the exit 13 inside the case 11. In FIG. 1, indicated at A21 is a loop detecting sensor for detecting a paper loop formed at the discharge accumulating unit A2.

The mode of operation of the automatic photographic printer thus constituted will be described hereinafter.

A paper is passed automatically through the automatic photographic printer by the following procedures.

Prior to the conveyance of the paper, the electromagnetic actuator 56 of the movable guide unit 5 is actuated to set the guide plate 51 at the closed position (indicated by double-dots-dashes lines in FIG. 1) and the control motor 27 is actuated to set the paper guide 24 in a horizontal position to form a paper passage. In the paper delivering unit 7, the loop forming roller R5 and the pressure roller 92 and the associated rollers are separated from the paper passage PB as indicated by alternate long and two short dashes lines in FIG. 3 (initial state). That is, the output shaft of the motor 72 is rotated in the reverse direction to turn the cam 71 counterclockwise to bring the portion having a large radius into contact with the cam rollers 87 and 95. Consequently, the supporting arms 82 and 94 are caused to swing on the shafts 81 and 93 to raise the loop forming roller R5, the regulating roller 84 and the folding preventing roller 86 supported on the supporting arm 82, and the pressure roller 92 supported on the supporting arm 94, respectively.

After the completion of the foregoing preparatory procedure, a paper is introduced into the automatic photographic printer. The leading edge of the roll of paper contained in the magazine 40 is pulled out to the extremity of the paper guide 46, then the magazine 40 is mounted on the case 11 so that the paper guide 46 is disposed between feed roller 41 and the raised pressure roller 42 (indicated by doublle-dots-and-dashes lines in FIG.1), and then the pressure roller 42 is lowered to its operating position to complete the loading of the magazine 40. In this state, the feed roller 41 and the pressure roller 42 hold the paper Q therebetween in the recesses 3a and 3b of the paper guide 46.

Then, the motor 43 of the paper feeding unit 4 and the pulse motor 63 of the paper transferring unit 6 are actuated. Consequently, the feed roller 41 and the pressure roller 42 are rotated to pass the paper Q through the movable guide unit 5, the guide roller R1, the turn guide 60 and the exposure unit 2 to the paper transferring unit 6, and then the paper Q is driven by the main transfer roller 61 and is passed through the turn roller R2, the perforating unit 10 and the cutting unit 20. Upon the detection of the leading edge of the paper by the hole detector 30, the motor 43 of the paper feeding unit 4 and the pulse motor 63 of the paper transferring unit 6 are stopped to interrupt the conveyance of the paper temporarily.

During the preparatory paper passing operation, the circumferential speed of the main transfer roller 61 of the paper transferring unit 6 is higher than that of the feed roller 41 of the paper feeding unit 4. Accordingly, after the leading edge of the paper has reached the paper transfer roller 61, the paper is conveyed at the circumferential speed of the main transfer roller 61 in synchronism with the intermittent rotation of the same, and hence the feed roller 41 is allowed to overrun at the circumferential speed of the main transfer roller 61 by the agency of the one-way clutch of the motor 43.

Then, the electromagnetic actuator 56 of the movable guide unit 5 is de-energized to release the guide plate 51 free, and thereby the guide plate 51 is opened as indicated by continuous lines in FIG. 1 by the extension spring 53. In this state, the pulse motor 63 of the paper transferring unit 6 is reversed to return the paper until the leading edge of the paper is brought to a position slightly beyond the main transfer roller 61, for example, a position marked by an asterisk (*) in FIG. 1, while the feed roller 41 of the paper feeding unit 4 remains stationary to accumulate the paper having a length corresponding to the length of the paper returned in a loop in the first accumulating unit A1. Then the paper guide 24 of the exposure unit 2 is raised to open the exposure area 22 for the exposure process. If the paper guide 24 is used also as a mask, the paper guide 24 need not be raised. Thus, the automatic loading of the paper is completed.

In the present invention, as stated above, the paper can be set automatically on the exposure unit after it is drawn from the magazine 40. In this state, the tip end of the paper is set on a position (position of mark *) directly after the paper transferring unit 6 by the return movement of the paper, so that the loss of paper becomes small.

The paper thus loaded is subjected to the exposure process in the exposure unit 2. In the exposure process, ordinarily, first the large area transmittance density (LATD) of the negative film F is measured by the photometric elements 36, color blaance and color density is adjusted automatically on the basis of photometric measurements obtained by the photometric elements 36, and then the color balance and the color density are corrected further by an operator to decide a standard lighting condition. Then, the color compensating filters of the light source 31 and the dark shutter 35 are controlled according to the standard lighting condition for exposure. Upon the completion of the exposure cycle, the output shaft of the pulse motor 63 of the paper transferring unit 6 is rotated in the normal direction to advance the paper by a predetermined distance to bring the following unexposed portion of paper into the exposure area 22 for the next exposure operation.

The length of the paper accumulated in the feed accumulating unit A1 decreases with the progress of the expsoure operation, and hence the bottom of the loop is raised gradually. Upon the detection of the bottom of the loop by the loop detector A11, the motor 43 of the paper feeding unit 4 is actuated to feed the paper until the loop is expanded sufficiently. Accordingly, the paper of a length above a fixed length is always accumulated in the first accumulating unit A1, and hence the paper is conveyed in the normal direction without being subjected to an excessive tension for accurate and smooth conveyance.

A hole is formed in the exposed paper at a specific position according to previously stored information corresponding to the size and style of the prints. The hole is used as a mark for indicating a cutting position in cutting the paper after developing and drying processes or a mark for indicating the position of cutting the paper in forced cutting which will be described later. The exposed paper is conveyed by the main transfer roller 61 through the cutting unit 20 and the hole detector 30 to the paper delivering unit 7.

The paper is guided by the paper guides 70a and 70b and reaches the inlet of the discharge accumulating unit A2, is conveyed across the upper part of the discharge accumulating unit A2 and is conveyed along the paper guides 74a and 74b as indicated by double-dots-and-dashes lines in FIG. 3. The paper is conveyed along the guide section 701 having the shape of an arc of a circle of the paper guie 70a owing to its intrinsic resilience and is conveyed along the paper guides 74a and 74b. Therefore, the paper does not fall into the second accumulator A2. Upon the detection of the leading edge of the paper by the paper detector 75, the operation of the paper transferring unit 6 is interrupted to stop the conveyance of the paper.

The passage of the paper across the upper part of the discharge accumulating unit A2 is detected by the following manner. The distance of movement of the paper after passing the hole detector 30 is monitored, and when the leading edge of the paper is detected by the paper detector 75 at the coincidence of the distance of movement of the paper with the distance corresponding to the distance of conveyance of the paper between the hole detector 30 and the paper detector 75, it is considered that the paper has been normally across the upper part of the second accumulating unit A2. If not, it is decided that the conveyance of the paper is abnormal and an alarm is provided.

After the leading edge of the paper has been detected by the paper detector 75 and the conveyance of the paper has been interrupted, the motor 72 is reversed to turn the cam 71 counterclockwise through an angle of 180° degrees to lower the cam rollers 87 and 95. Consequently, the loop guide roller R5, the regulating roller 85, the warpping preventing roller 86 and the pressure roller 92 are lowered to positions indicated by continuous lines in FIG. 1, respectively. In this state, the paper is held firmly at the leading edge between the delivery roller 91 and the pressure roller 92 and is pressed downward in a curve by the loop forming roller RR5. Therefore, when the paper is conveyed in the normal direction by operating the paper transferring unit 6 again with the motor 72 stopped, the paper advances downward be being curved downward by the loop forming roller R5 and is accumulated in the discharge accumulating unit A2. After the length of the paper accumulated in the discharge accumulating unit A2 has exceeded a certain value, the motor 72 is actuated so that the output shaft thereof rotates in the normal direction to drive the delivery roller 91 for rotation in a clockwise direction to deliver the paper. The paper accumulated in the discharrge accumulating unit A2 is delivered between the guide roller R4 and the regulating roller 85 and between the delivery roller 91 and the pressure roller 92, and is delivered outside the body 1 through the exit 13.

Figure 4:
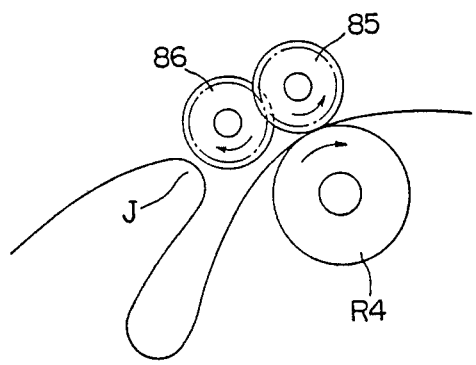
FIG. 4 is a schematic fragmentary illustration showing part of the paper delivering unit.

While the paper is thus being delivered, the regulating roller 85 rotates counterclockwise, while the folding preventing roller 86 rotates clockwise because the regulating roller 85 and the folding preventing roller 86 are interlocked by the meshing gears. The clockwise rotation of the folding preventing roller 86 prevents the abnormal conveyance of the paperr. As shown in FIG. 4, for example, when a fold J is formed in the paper being conveyed, the fold J is repelled away from the preceding portion of the paper by the clockwise rotation of the folding preventing roller 86, so that the entry of the fold J between the guide roller R4 and the regulating roller 85 is prevented, and thereby the paper is conveye smoothly.

The paper accumulated in the discharge accumulating unit A2 is delivered outside the body 1 through the exit 13 and is supplied continuously at a fixed speed corresponding to the processing speed of an automatic developing apparatus, not shown. Generally, in an automatic developing apparatus, the exposed paper must be conveyed at a specific fixed speed to achieve predetermined development. Ordinarily, the exposure processing speed of an automatic photographic printer is higher than the development processing speed of an automatic developing apparatus. Accordingly, developing process can be continued without interruption by accumulating the exposed paper in the discharge accumulating unit A2 of the automatic photographic printer.

Forced paper cutting during the delivery of the paper will be described hereinafter.

When the exposure operation of the automatic photographic printer is interrupted, the paper transferring unit 6 is stopped to interrupt the transfer of the paper to the discharge accumulating unit A2, while the delivery roller 91 of the paper delivering unit 7 is driven continuously in relation to the operation of the automatic developing apparatus to deliver the exposed paper continuously to the automatic developing apparatus, and hence the length of the exposed paper accumulated in the discharge accumulating unit A2 decreases gradually. Accordingly, if the delivery of the exposed paper is continued in this state, the exposed paper will be torn sooner or later. In order to prevent such accidental breakage of the paper, the cutting unit 20 is actuated automatically when the length of the paper accumulated in the second accumulating unit A2 is reduced to a fixed extent to cut the paper. This mode of operation is referred to as "forced paper cutting".

Concretely, the forced paper cutting is executed in the following manner. Upon the detection of the contraction of the paper loop accumulated in the discharge accumulating unit A2 by the loop detector 21, the pulse motor 63 of the paper transferring unit 6 is reversed to transfer the paper in the reverse direction toward the cutting unit 20. If the reduction of the paper loop is detected during the progress of other operation, such as exposure operation or the conveyance of the paper in the normal direction by the paper transferring unit 6, the reverse conveyance of the paper is started after such other operation has been completed. Then, the hole formed in the paper after exposure is detected by the hole detector 30 and the cutting unit 20 is actuated for forced paper cutting on the basis of information obtained through the detection of the hole so that the paper is cut at an appropriate position with respect to the printed images.

The paper moved in the reverse direction for forced paper cutting and remaining on the side of the paper feeding unit 4 with respect to the exposure unit 2 is conveyed by the paper transferring unit 6 in the normal direction by a distance corresponding to the length of the paper moved in the reverse direction. Consequently, the paper is restored to a state before the reverse conveyance and a portion of the paper for the next exposure is set in the exposure area. Accordingly, the paper is prepared for the next exposure with little loss of paper.

On the other hand, the paper which has been accumulated in the discharge accumulating unit A2 is conveyed by the conveying mechanism 9 after the forced paper cutting operation and is delivered through the exit 13 to the automatic developing apparatus. Upon the detection of the trailing edge of the paper by the paper detector 75, the motor 72 is reversed to turn the cam 71 counterclockwise through an angle of 180° degrees to raise the loop forming roller R5, the regulating roller 85, the folding preventing roller 86 and the pressure roller 92 in the same manner as that for loading the paper to establish the initial state as indicated by alternate long and two short dashes lines in FIG. 3. Thereafter, the same operation as that for loading the paper is executed to deliver the paper by the action of the paper delivering unit 7. During the interval between the forced paper cutting operation and the completion of the establishment of the initial state, the conveyance of the following portion of the paper to the paper delivering unit 7 is impossible. Accordingly, the longer the interval, the greater the reduction of the process efficiency will be, which is undesirable. Therefore, in order to diminish such an adverse effect of forced paper cutting, the speed of the motor 72 is controlled automatically so that the portion of the paper separated from the following portion of the paper will be delivered at a sufficiently high speed as compared with the processing speed of the automatic developing apparatus for quick delivery, which reduces the interval, namely, time loss, for example, from tens of seconds to a matter of a few seconds. The paper delivered to the automatic developing apparatus at an increased speed may be accumulated in an accumulator provided in the automatic developing apparatus.

Figure 5:
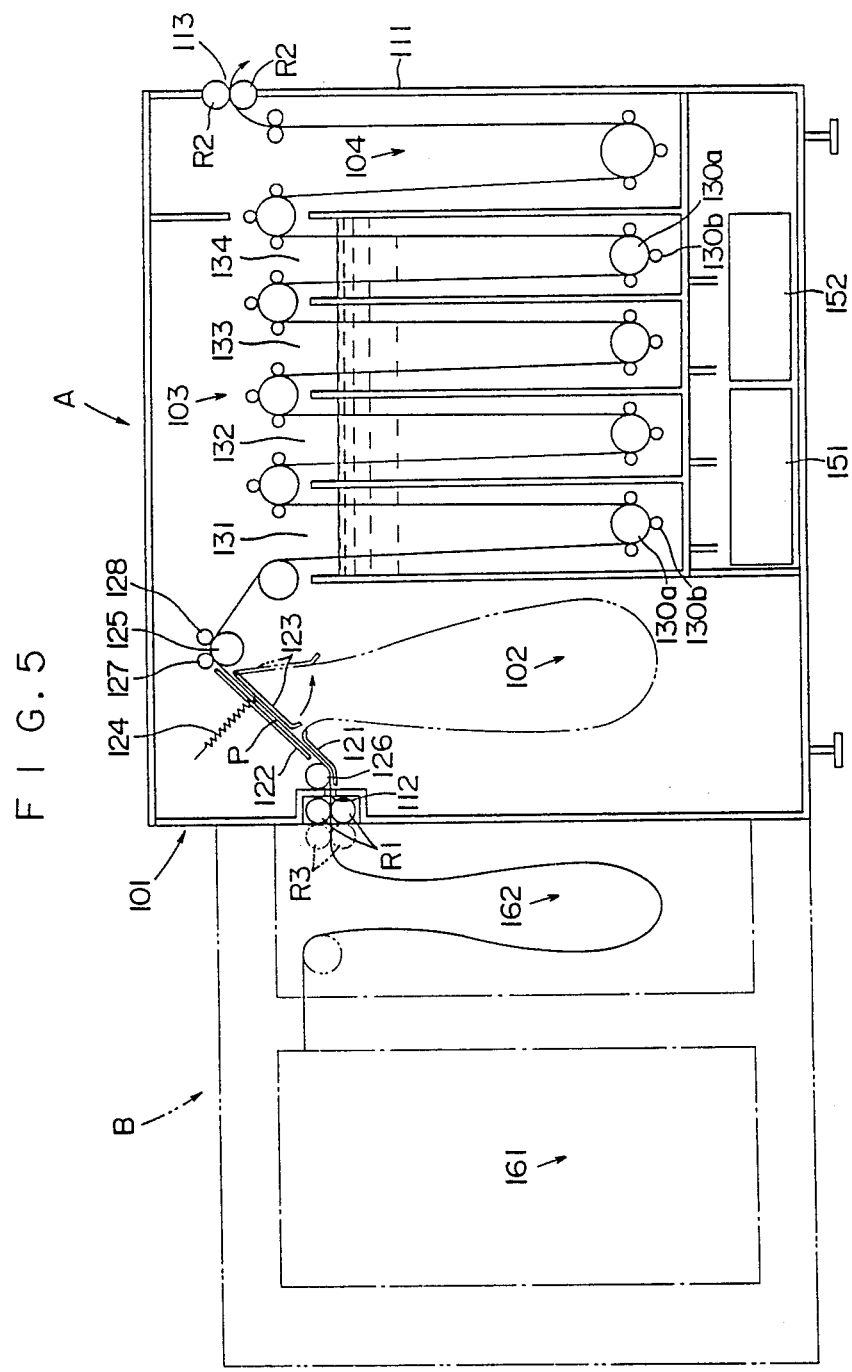
FIG. 5 is a view showing other embodiment of the present invention.

FIG. 5 shows schematically a front view of an internal construction of an automatic developing apparatus A in the other embodiment of the present invention with a side plate removed.

Indicated at 101 is a main body of the automatic developing apparatus shield from light by a case 111. An inlet 112 for introducing exposed sensitive photographic materials (hereinafter referred to as merely "paper") is provided at one side plate of the case 111, and an outlet 113 for discharging the developed paper at the other side.

Inside of the main body 101 provided are a paper accumulating unit 102 for accumulating temporarily the paper fed from the inlet 112 to the outlet 113, a developing processing unit 103 consisting of a plurality of processing tanks and a drying unit 104 for drying the developed paper in this order.

The paper accumulating unit 102 is shaped as a box and at the upper portion thereof a paper path P directing obliquely and upwardly is formed by guides 121, 122 and movable guie 123.

The movable guide 123 is located at the lower portion of the paper path P, an upper end thereof is pivoted and a middle portion thereof is connected to an end of a spring 124. The movable guide 123 is arranged along the paper path P by selecting the tensile force of the spring 124 at the normal state wherein the paper is transferred at a developing processing speed, whereas the movable guide 123 is arranged such that it is moved outwardly from the paper path P by the pressing force of the paper at the abnormal state wherein the paper is transferred at a speed higher than the developing processing speed.

Indicated at 125 is a transferring roller driven at a constant speed in order to transfer the paper at the developing processing speed. Indicated at 126-128 are guide rollers for guiding the paper.

The developing processing unit 103 comprises a developing tank 131, a bleaching and fixing tank 132, a first rinsing tank 133 and a second rinsing tank 134 arranged side-by-side relationship. In each tank, rollers 130a and 130b for transferring the paper.

In the drying unit 104, a hot wind is ejected to the developed paper for drying by a blower (not shown), for example.

Indicated at R1 and R2 in the drawing are a pair of feed rollers mounted at the inlet 112 and outlet 113. 151 and 152 are tanks for waste liquid discharged from the processing tanks 131-134.

The automatic developing apparatus A as stated above is used by connecting directly with an automatic printing apparatus B shown in FIG. 5 by chain lines. The automatic printing apparatus B used in this example comprises a paper accumulating unit 162 for accumulating temporarily the paper fed from a printing processing unit 161 wherein a latent image is formed by exposing the unexposed paper. The paper in said paper accumulating unit 162 is disharged at a feeding speed corresponding to the processing speed of the automatic developing apparatus A by a pair of feed rollers R3.

The paper processed for exposure in the automatic printing apparatus B and discharged by the feed rollers R3 is transferred in the light shielding state through the inlet 112 of the automatic developing apparatus A to the inside of the main body 101 by the rollers R1, and then to the developing processing unit 103 through the guides 121, 122 and movable guide 123. The paper is dipped in each processing liquid while passing through the processing tanks 131–134 of the developing processing unit 103 for processing. The paper is then dried while passing through the drying unit 104 and discharged from the outlet 113 of the main body 101 by the feed rollers R2 and subjected to the cutting process etc. to form final prints.

In the prosecution of the printing and developing processings, the exposed paper is accumulated in the paper accumulating unit 162 of the automatic printing appararus B, because the processing speed at the automatic printing apparatus B is set normally at a value higher than the processing speed at the automatic developing apparatus A. When the exposing processing at the automatic printing apparatus is interrupted the paper is cut by a cutter (not shown) at the automatic printing apparatus B and only the exposed paper is accumulated in the paper accumulating unit 162. When such cutting of the paper is conducted and the exposed paper is remained in the paper accumulating unit 162, further forwarding of the paper can not be carried out. Accordingly, it is necessary to wait until the paper in the paper accumulating unit 162 is shifted perfectly into the automatic developing apparatus A in order to carry out the next exposing processing. However, if the paper is transferred at a regular speed, that is, the processing speed of the automatic developing apparatus A, a long time is required for the paper forwarding and the rate of operation of the automatic printing apparatus B becomes low.

On the contrary, the automatic developing apparatus A has the paper accumulating unit 102 and the exposed paper fed from the automatic printing apparatus B can be accumulated temporarily therein, so that the cut paper remained in the paper accumulating unit 162 of the automatic printing apparatus B can be transferred quickly at a speed higher enough than the regular speed and the problem stated above can be solved. When the paper is transfered quickly as above, the movable guide 123 is urged by the paper and rotated so as to separate from the path P against the tensile force of the spring 124 and becomes to the open state, because the speed of the transferring roller 125 is constant. The paper drops by its own weight in the paper accumulating unit 102 and accumulated therein.

It is appreciated that the present invention is not limited as above and the construction of the paper guide at the paper accumulating unit etc. can be modified suitably.

Industrial Applicability

As stated above, according to the present invention the return to the initial state can be achieved quickly by discharging the photographic paper in the discharge accumulating unit while it is transferred quickly after cutting forcedly the photographic paper. Accordingly, an automatic photographic paper processing apparatus haaving little loss time and a high rate of operation can be obtained. According to the automatic photographic paper processing apparatus the exposed paper can be transferred smoothly in accordance with the processing speed of the automatic developing apparatus even when the exposed paper discharged from the printing apparatus is supplied continuously to the automatic developing apparatus, so that the systematization with the automatic developing apparatus can be made easily.

Further, in the present invention, by providing the paper accumulating unit between the inlet of the main body of the developing apparatus and the developing processing unit, the difficulty at the continuous feeding of the paper caused by the difference in processing time between the automatic printing apparatus and the automatic developing apparatus can be lightened, so that the systematization of the both apparatuses can be attained easily and the developing processing of good efficiency can be carried out.

We claim:

1. In a photographic photosensitive material processing apparatus comprising
   an exposing portion for imagewise exposing an elongated photographic photosensitive material to form exposed photographic material,
   a first accumulator for temporarily accumulating said exposed photographic material,
   a developing processing portion for developing processing said exposed photographic material, and
   cutter means for cutting away said exposed photographic material from an unexposed section of said photographic photosensitive material,
   the improvement which comprises
   a second accumulator provided between said first accumulator and said developing processing portion,
   rotatable transfer means between said first accumulator and said second accumulator, and
   control means for controlling said rotatable transfer means such that the transfer speed of said rotatable transfer means becomes higher than that of developing process portion after said photographic photosensitive material is cut after interruption of said imagewise exposing,
   wherein, after said photographic photosensitive material is cut, photographic photosensitive material remaining in said first accumulator is exhausted continuously into said second accumulator, and said rotatable transfer means is thereafter ready to receive said photographic photosensitive material fed in accordance with the next imagewise exposing.

2. The apparatus of claim 1 wherein said rotatable transfer measn comprises a pair of rollers.

3. The apparatus of claim 1 wherein said control means comprises a variable speed motor.

4. The apparatus of claim 1 further comprising a guide plate provided at a portion adjacent said second accumulator and urged in one direction by spring action of said photographic photosensitive material while fed at a higher speed, whereby accumulation of said material forces said guide plate into an open position, thereby permitting said material to enter said second accumulator.

5. A photographic photosensitive material processing apparatus comprising an accumulator for temporarily accumulating an elongated photographic photosensitive material exposed and transferred intermittently,
   transfer means provided downstream of said accumulator for transferring said photographic photosensitive material to a processing portion, said transfer means comprising first and second rollers, said first roller adapted to be brought into and out of contact with said second roller,
   driving means for said transfer means comprising a reversible motor,
   said first and second rollers adapted to be brought out of contact with each other by rotation of said motor in a first direction, and brought into contact with each other by further rotation of said motor in said first direction, and being driven by rotation of said motor in a second direction, thereby transferring said photographic photographic photosensitive material to said processing portion, a sensor downstream of said transfer means, control means for controlling said driving means so that said driving means rotates in said first direction when said photographic photosensitive material is loaded, rotates further in said first direction when a leading edge of said photographic photosensitive material is detected by said sensor thereby bringing said first and second rollers into contact, said photographic photosensitive material being transferred at a speed substantially the same as the speed of said processing portion.

6. The apparatus of claim 5 having a forming means for forming a loop in said photographic material which comprises a feed means and a stop means downstream thereof, said feed means and said stop means adapted to be in contact with said photographic material at the same time, whereby continued movement of said feed means causes formation of said loop.

7. The apparatus of claim 6 wherein said means for forming a loop is roller.

8. The apparatus of claim 6 wherein said forming means is located adjacent an upper portion of said accumulator.

9. The apparatus of claim 8 wherein said means for forming a loop is a roller.

10. The apparatus of claim 5 wherein said processing portion is a developing portion.

* * * * *